United States Patent
Matsunaga

[19]

[11] Patent Number: 6,111,993
[45] Date of Patent: Aug. 29, 2000

[54] STRAIGHT LINE DETECTING METHOD

[75] Inventor: Shinichi Matsunaga, Wako, Japan

[73] Assignee: Honda Giken Kogyo Kabushiki Kaisha, Tokyo, Japan

[21] Appl. No.: 09/006,105

[22] Filed: Jan. 13, 1998

[30] Foreign Application Priority Data

Jan. 16, 1997 [JP] Japan .................................... 9-038288

[51] Int. Cl.⁷ .................................................. G06K 9/36
[52] U.S. Cl. ........................... 382/281; 382/199; 382/103
[58] Field of Search ..................... 382/281, 199, 382/103, 104, 200; 235/456

[56] References Cited

U.S. PATENT DOCUMENTS

| | | | |
|---|---|---|---|
| 5,220,621 | 6/1993 | Saitoh ..................................... | 382/200 |
| 5,365,600 | 11/1994 | Nagaishi ................................. | 382/281 |
| 5,430,810 | 7/1995 | Saeki ...................................... | 382/281 |
| 5,616,905 | 4/1997 | Sugiyama ............................... | 235/456 |
| 5,629,989 | 5/1997 | Osada ..................................... | 382/281 |
| 5,638,116 | 6/1997 | Shimoura et al. ...................... | 382/103 |
| 5,832,138 | 11/1998 | Nakanishi et al. ..................... | 382/281 |

OTHER PUBLICATIONS

Article entitled Navigation System Using Image Processing and Fuzzy Inference, pp. 407–416 (1991).

*Primary Examiner*—Yon J. Couso
*Attorney, Agent, or Firm*—Lyon & Lyon LLP

[57] ABSTRACT

A straight-line detecting method for detecting a straight line in an image by using a combinatorial Hough transform at a high speed by restricting a voting area to assure detection of a short line segment without decreasing a processing rate, which method comprises the steps of: determining parameters of Hough transform of a straight line passing a remarkable edge point (x1, y1) and another edge point (x2, y2) in a X-Y plane according to the transform equations $\theta=-a\tan\{(x1-x2)/(y1-y2)\}$ and $\rho=x1 \cos\theta+y1 \sin\theta$; voting of pixels corresponding to parameters ($\theta$, $\rho$); and detecting a straight line existing in the X-Y plane by the number of votes in a plane of $\rho$-$\theta$ parameters and which is characterized in that another edge point (x2, y2) is a point existing in any of specified neighboring areas positioned at right and left and above and below from a center area where the remarkable edge point (x1, y1) is located.

2 Claims, 6 Drawing Sheets

STRAIGHT LINE DETECTING METHOD

BACKGROUND OF THE INVENTION

The present invention relates to a straight-line detecting method for extracting a straight line lying in an X-Y plane of, e.g., an image.

Recently, there has been developed an automatic travelling vehicle which is capable of taking an image of an area ahead of the vehicle through a video camera attached thereto, detecting edges of a road or divisional lines indicated thereon in the image by applying an image processing technique and recognizing a permissible travelling area on the road.

A line segment existing in a X-Y plane of, e.g., an image is usually detected by such a straight-line detecting method which generates a Hough transformed curve relating to an edge point by utilizing the continuity of edge points on a straight line, gives a vote to a pixel through which the curve passes and, thereby, determines a straight line by detecting a peak point according to the number of votes of pixels in a space defined by the Hough transform parameters.

According to the above-mentioned method, voting is made of all the pixels corresponding to parameters of straight lines that have the possibility to pass through an edge point. This means that a part of the total number of votes is given to line parameters that can not be even candidates. Consequently, the parameter space expands and requires a large number of voting times. This requires a large-capacity memory for voting and takes substantial time for processing data. Neighbors to pixels corresponding to the line parameters may also have votes, causing poor distinctness of a peak point, i.e., decreasing an accuracy of detecting the straight line.

Another combinatorial Hough transform method has been also proposed.

Hough transformation parameters for a straight line passing a remarkable edge point (x1, y1) in an X-Y plane and another edge point (x2, y2) are determined according to the equations:

$$\theta = a\tan\{(x1-x2)/(y1-y2)\} \quad (1)$$

$$\rho = x1\cos\theta + y1\sin\theta \quad (2)$$

A vote is given only to a pixel corresponding to ($\theta$, $\rho$).

The combinatorial Hough transform method improves the accuracy of detecting a straight line since only pixels corresponding to a straight line collects votes, thus obtaining a distinct peak point. This method, however, also requires substantial time to process the data since the number of voting times considerably and sharply increases.

Accordingly, the conventional combinatorial Hough transform method restricts a voting area to two points which satisfies the following conditions concerning two points (x1, y2) and (x2, y2):

$$|x1-x2| < \epsilon x \quad (3)$$

$$|y1-y2| > \epsilon y \quad (4)$$

where $\epsilon x$ and $\epsilon y$ are constants.
This is disclosed in "An unattended travelling system into which image processing and fuzzy reasoning amalgamates", pp. 407–416, Journal FUJITSU No. 42, vol. 4, issued in September of 1991.

Figure 3:
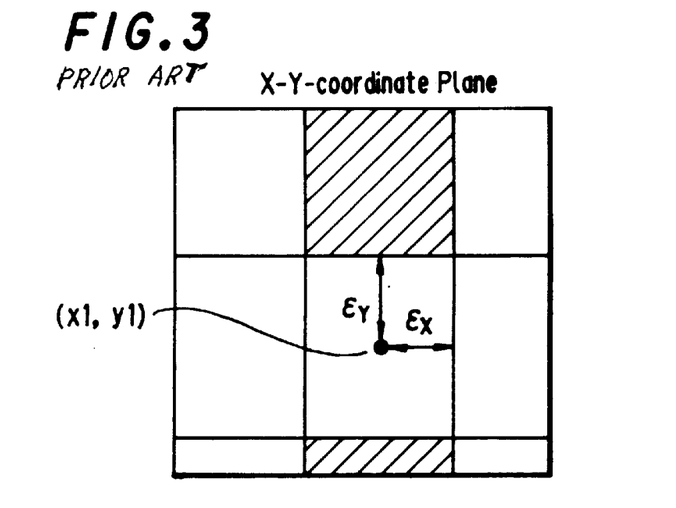
FIG. 3 is illustrative of an area of voting by conventional combinatorial Hough transform.

FIG. 3 is ilustrative of the above-metioned conditions. As is apparent from FIG. 3, this method may attain an improved sensitivity in vertical (Y) directions but can not attain a sufficient sensitivity in horizontal (X) directions because increasing the sensitivity in X-directions is accompanied by widening a voting area and elongating data-processing time. Furthermore, reducing a voting area in Y-directions makes it hard to detect short line segments.

The problems involved in the conventional method based on a voting type combinatorial Hough transform are such that restricting a voting area to two points satisfying the conditions (3) and (4) relative to the points (x1, y1) and (x2, y2) may increase the processing speed but have a low sensitivity of detecting a straight line in the horizontal direction. It can not efficiently detect short line segments.

SUMMARY OF THE INVENTION

Accordingly, a primary object of the present invention is to provide a straight-line detecting method which is free from the above-mentioned drawbacks of the conventional method and which is based on a voting type combinatorial Hough transform and comprises steps of determining Hough transform parameters of a straight line passing through a remarkable edge point (x1, y1) and another point (x2, y2) in a X-Y plane according to transforming equations (1) and (2), giving votes to pixels corresponding to parameters ($\theta$, $\rho$) and detecting a straight line lying in the X-Y plane by the number of votes in a parameter plane of $\rho$-$\theta$ and which can attain an increased speed of processing and an improved sensitivity of short line segments by restricting a voting area in such a way that other edge points (x2, y2) may be located in specified neighboring areas being left, right, above and below from the remarkable edge point (x1, y1).

DESCRIPTION OF THE PREFERRED EMBODIMENT

The preferred embodiments of the present invention will now be described in detail referring to the accompanying drawings.

Figure 1:
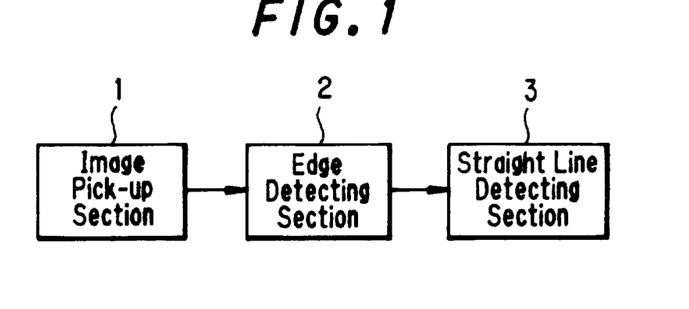
FIG. 1 is a block diagram showing an exemplified system embodying a straight-line detecting method according to the present invention.

FIG. 1 is a block diagram showing an exemplified system for implementing a straight-line detecting method according to the present invention. The system comprises an image pickup section 1, an edge detecting section 2 for detecting an edge of an image inputted through the image pickup section by differential processing of the digital image composed of pixels and a straight-line component detecting section 3 for transforming by Hough a sequence of points representing the edge detected in the image, detecting a peak point by the number of votes to pixels in a Hough-transformed parametric space, judging an edge point sequence corresponding to a Hough-transformed curve passing the detected peak point to be a straight line and thus detecting straight-line components in the image.

In the straight-line component detecting section 3 of the above-mentioned system according to the present invention, a voting type combinatorial Hough-transformation is conducted in such a manner that Hough-transformation parameters of a straight line passing through a remarkable edge point (x1, y1) and another edge point (x2, y2) in a X-Y plane of an image is determined according to the transform equations (1) and (2), one-point vote is given each of the pixels corresponding to parameters (θ, ρ) and a straight line lying in the X-Y plane is detected by the number of votes in a θ-ρ-parameter plane. In addition, the voting area is restricted to neighboring areas being (left, right, above and below) around a remarkable pixel (x1, y1) and the other edge point (x2, y2) and must be located in any one of the neighboring areas.

Figure 2:
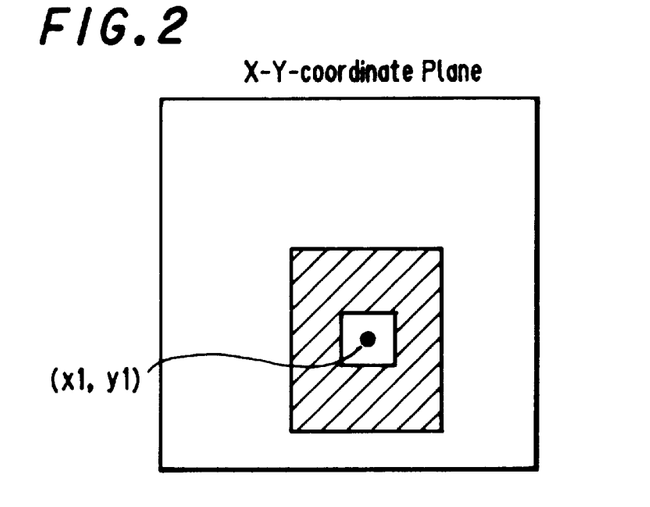
FIG. 2 is illustrative of an area of voting by continuous edge restricting combinatorial Hough transform according to the present invention.

FIG. 2 is illustrative of a voting area of the straight-line detecting method according to the present invention.

The basic principle of a conventional straight-line detecting method based on the Hough-transform voting and the straight-line detecting method according to the present invention are described below in detail.

Figure 12:
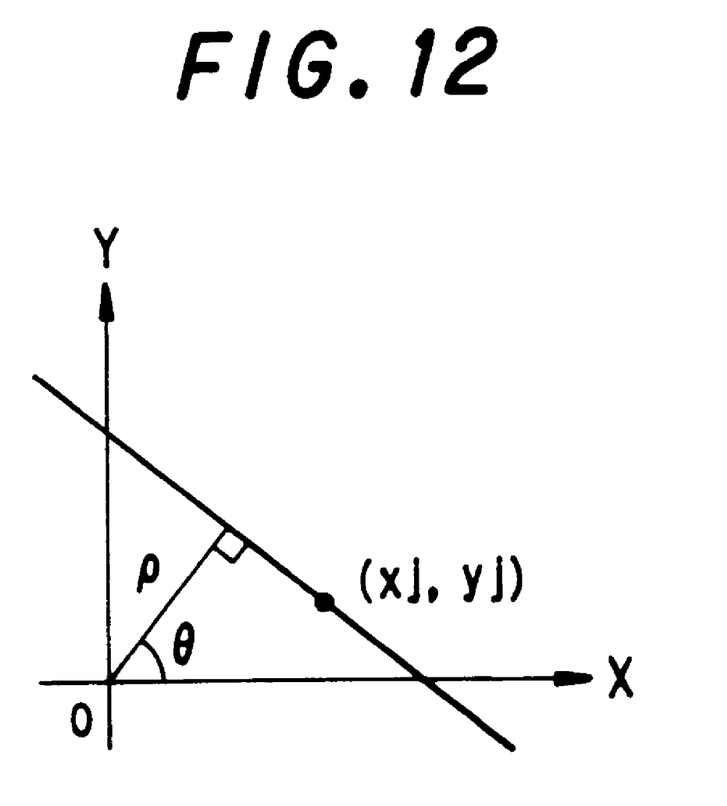
FIG. 12 shows a relation between a straight line in an X-Y coordinate plane and parameters of Hough transform.

As shown in FIG. 12, a straight line in an X-Y plane is expressed by the following equation (5) when a perpendicular drawn from an origin of the coordinate to the straight line has a length ρ and forms an angle θ with the X-axis.

$$\rho = x \cos\theta + y \sin\theta \quad (5)$$

A point-sequence (xj, yj) of given data may have the following equation (6) that is a composite trigonometric function.

$$\rho = xj \cos\theta + yj \sin\theta \quad (6)$$

This sine curve is called a Hough curve that represents a group of all curves passing a point (xj, yj). Accordingly, equation 6 is calculated for a point-sequence (xj, yj) of the given data and a Hough curve is drawn in a parametric space of a ρ-θ plane, a group of curves or straight lines contained in the point-sequence of the data is represented by Hough curves concentrating at a corresponding point (θo, ρo) and forms a peak point at which the Hough curves intersect one another at a maximum frequency. The straight line can be detected by detecting this peak point. According to a practical image processing technique, a certain pixel in an image in a quantized ρ-θ-plane in a memory is calculated with an increment of value θ according to Equation (6), votes are given to corresponding pixels in the memory and a peak point corresponding to a pixel attaining a heavy vote is detected as parameters of the searched straight line. This conventional straight-line detecting method based on the voting type Hough-transform is a noise-suppressing type totally detecting method that can advantageously detect a broken point sequence. On the other hand, this method has such disadvantages that it requires a large memory space to form a parametric space, a high cost of processing and a low detection accuracy.

In detecting a straight line by the conventional voting type Hough-transform method, a Hough curve is generated and pixels through which the curve passes may also be voted. Namely, pixels corresponding to parameters of a straight line that may pass through an edge point are voted. On the whole, it is clear that straight line parameters that can not be candidates are voted, resulting in expanding a parameter space with a complex vote result. In this case, pixels corresponding to parameters of a straight line in a pattern space (image) are voted (to be a peak value as a result) and neighbors are also voted, thus making the peak value unclear.

In detecting a straight line by voting type combinatorial Hough-transform, voting is made to only one pixel corresponding to (θo-ρo) calculated from the following Equations (7) and (8) for two optional points in a pattern space.

$$\theta o = -a \tan\{(xi-xi)/(yi-yj)\} \quad (7)$$

$$\rho o = xi \cos\theta o + yi \sin\theta o \quad (8)$$

Consequently, only pixels corresponding to parameters of a straight line in a parametric space are voted, thus obtaining a clear peak value.

Combinatorial Hough-transform is to select two optional points in a point sequence in a pattern space (image) and vote to corresponding pixels in a parametric space. This method, however, may have a large voting frequency sharply increasing as the number of data points increases. This increases, of course, the processing cost.

In view of the foregoing, the present invention provides a limited-continuous-edge type combinatorial Hough-transform method which limits combinations of two points to be selected by the combinatorial Hough-transform technique, making the sacrifice, to some degree, of the total detecting power of the conventional Hough-transform technique. Namely, points to be combined with a remarkable point are selected only within a neighboring area around the remarkable point on the assumption that a sequence of data (edge) points composing a straight line continues to one another at a certain degree.

Figure 4:
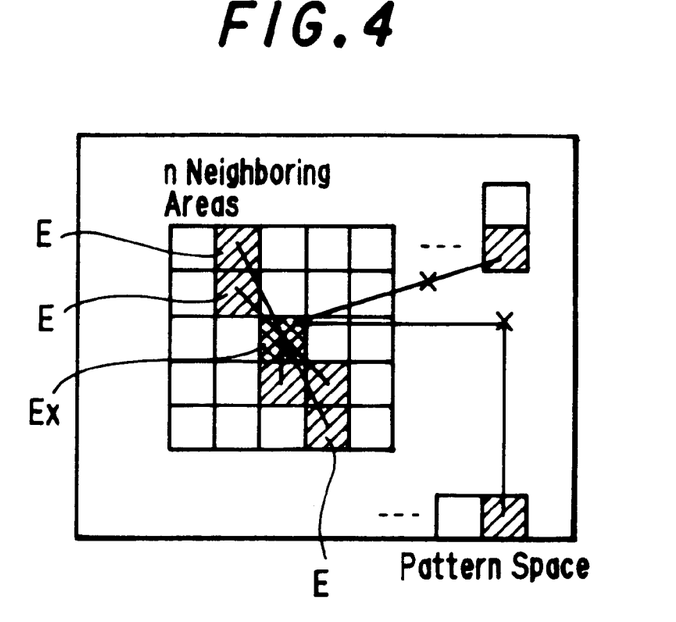
FIG. 4 shows an example of objects to be voted in neighboring areas around a center remarkable point for combinatorial Hough transform with a restricted continuous edge according to the present invention.

As shown in FIG. 4, a remarkable (object) point Ex in a pattern space is combined with each optional data (edge) points E in n neighboring areas around the remarkable point and calculated according to Equations (7) and (8). Pixels obtained are then voted. In this case, voting is limited to pixels within the n-neighboring areas in view of the continuity of an edge in the image.

Figure 5:
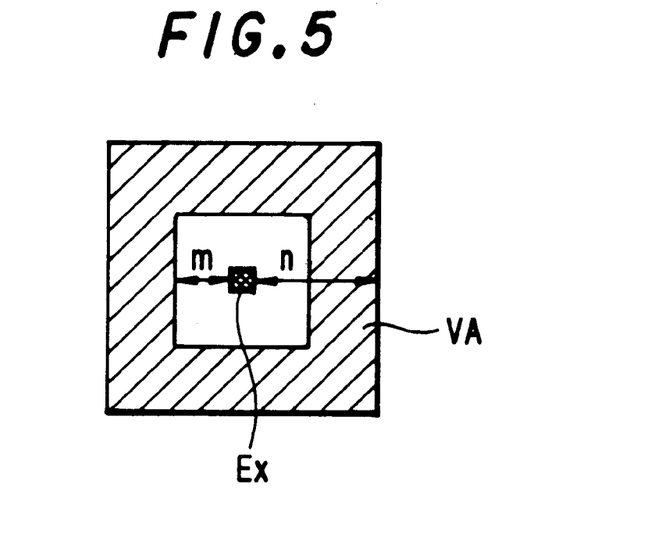
FIG. 5 shows a neighboring area around a center remarkable point for combinatorial Hough transformation with a restricted continuous edge according to the present invention.

In practice, the combination of the remarkable pixel with each of 8 neighboring pixels can not accurately detect a value e and, therefore, a voting area VA is defined within a range of not nearer than m-neighboring area and not further than n-neighboring area (m<n) as shown in FIG. 5. In the concrete, the voting area is set in such a way that m is not less than 3 pixels and n is not more than 10 pixels.

According to the limited continuous edge type combinatorial Hough-transform, a voting rule is determined by an optional edge point and a neighboring edge point in a pattern space, thereby voting is made to a corresponding point in a parametric space. In this case, the voting frequency depends upon the number of edge points in neighboring voting areas. In the combinatorial Hough-transform, a resolution of a straight line extracted by detecting a single corner peak is determined by resolution of ($\rho$, $\theta$). On the contrary, the resolution of an extracted straight-line by using the limited continuous edge type Hough-transforming method is determined by the resolution of ($\rho$, $\theta$) and the size of the neighboring voting area.

Accordingly, the limited continuous edge type combinatorial Hoigh-transform according to the present invention may avoid, to a certain degree, voting to a parameter of line-segment between discontinuous edge points, considerably reducing voting frequency as compared with the simple combinatorial Hough-transform. A continuous line segment can have an emphasized peak value.

The straight-line detecting accuracy of the limited-continuous-edge type combinatorial Hough-transform method (hereinafter referred to as LCHT) in comparison with the conventional combinatorial Hough-transform method (hereinafter referred to as CHT) will be examined by using randomly produced edge images.

Figure 6:
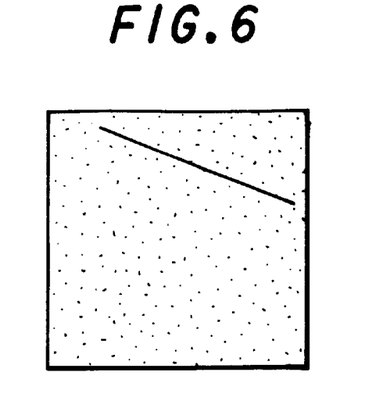
FIG. 6 is illustrative of a test image having a single random line.
Figure 7:
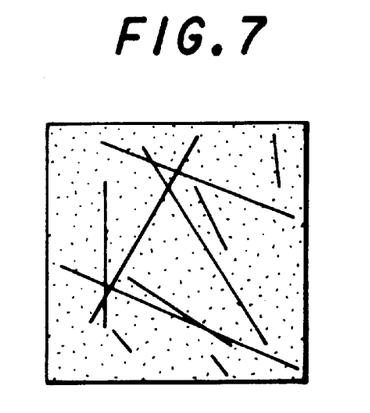
FIG. 7 is illustrative of a test image having ten (10) random lines.
Figure 8:
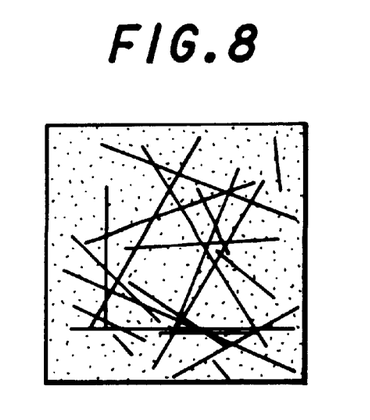
FIG. 8 is illustrative of a test image having twenty (20) random lines.

A plurality of images each consisting of 512×512 pixels was used as simulation test images. Each of the images has a $\rho$-$\theta$ space resolution of 91×91 ($\Delta\theta$=2.0 deg/dot, $\Delta\rho$=0.1697 mm/dot) and a specified number of simple peaks (with no clustering) were extracted therefrom without limitation of a voting area. The number of test line-segment randomly produced was 1, 10 and 20 as shown in FIGS. 6, 7 and 8. Each of the random line-segments was given a gauss noise to examine the degree of the noise influence. Each of the test images was entire processed.

Items to be compared are the number of votes and the number of vote times (frequency), which are the total number of edge-points to be voted and the number of vote castings from each edge point to the $\rho$-$\theta$ space respectively. To determine how the frequency of votes to a Hough space point ($\rho$m, $\theta$n) corresponding to 1 meter of a test straight line distinguishes, the complexity of votes in neighboring areas around the point ($\rho$m, $\theta$n) is calculated according to the following entropical calculation method.

A probability event system expressed by the following equation (9) that each of the points existing within areas L×L (L is the number of pixels) around the point ($\rho$m, $\theta$n) is supposed.

$$\begin{bmatrix} (\rho_{m-[L/2]}, \theta_{n-[L/2]}) & \cdots & (\rho_m, \theta_n) & \cdots & (\rho_{m+[L/2]}, \theta_{n+[L/2]}) \\ p_{m-[L/2], n-[L/2]} & \cdots & p_{m,n} & \cdots & p_{m+[L/2], n+[L/2]} \end{bmatrix} \quad (9)$$

In Equation (7), Pj,k is equal to Nj,k/N as Nj,k is a frequency of ($\rho$i, $\theta$k) and N is the total frequency.

In this case, the neighboring area complexity C is defined by the following expression (10).

$$C = \sum_{j=m-[L/2]}^{m+[L/2]} \sum_{k=n-[L/2]}^{n+[L/2]} (-p_{j,k} \log p_{j,k}) \quad (10)$$

The complexity C takes a maximal value when points in an object area have the same equivalent frequency probability. The complexity C is equal to 0 if a certain point in the area gets a frequency probability of 1 and all base frequencies are 0. This indicates that the point stalked markedly over the neighboring area when C becomes near to zero. In this instance, L is 11.

Line extracting ratios for both methods were determined by manually counting the number of extracted line-segments and then dividing the counted number by the total number of test line-segments. The detection accuracy of each method was determined only on a test image having one line segment and by calculating parametric differences between the extracted segment and the test segment.

The simulation test results of the two methods on the above-mentioned comparative items are shown in Table 1. In Table 1, CHT is the conventional combinatorial Hough-transform method and LCHT is the limited continuous-edge type combinatorial Hough-transform method.

TABLE 1

|  |  | CHT | LCHT |
|---|---|---|---|
| 1 random | Number of Votes | 3515 | 3515 |
| straight | Number of Voting Times | 6175855 | 8840 |
| line + Noise | Complexity (11 × 11) | 4.085244 | 2.572772 |
|  | Extracting Ratio | 100% | 100% |
|  | Extracting Accuracy (as | −0.263350 deg. | −0.263350 deg. |
|  | compared with a sample) | 0.005578 mm | 0.005578 mm |
| 10 Random | Number of Votes | 5537 | 3515 |
| Straight | Number of Voting Times | 15326416 | 29534 |
| lines + Noise | Complexity (11 × 11) | 4.362024 | 3.325534 |
|  | Extracting Ratio | 60% | 70% |
| 20 Random | Number of Votes | 8179 | 8279 |
| Straight | Number of Voting Times | 33443931 | 69981 |
| lines + Noise | Complexity (11 × 11) | 4.473155 | 3.7303062 |
|  | Extracting Ratio | 45% | 70% |

The simulation test results show the following:

Generally speaking, the total voting frequency of LCHT is smaller than that of CHT. Particularly, CHT may have an explosive increase of the voting frequency with an increase of the number of edge points.

The complexity of processing by CHT is higher than that by LCHT. The complexity increases in both cases as the number of edge points to be voted. The complexity is more affected by a noise than by the number of line-segments. In other words, the complexity depends upon noise rather than the number of line-segments.

The extracting ratio by LCHT is higher than that by CHT. LCHT has a constantly high extracting ratio. This may closely relate to the complexity and, therefore, segments. In other words, the complexity depends upon noise rather than the number of line-segments.

The extracting ratio by LCHT is higher than that by CHT. LCHT has a constantly high extracting ratio. This may closely relate to the complexity and, therefore, makes it easy to do clustering. Both methods are poor in detecting a short line-segment.

CHT may have a heavy voting frequency as compared with LCHT. However, voting concentrates on parameters of a straight-line defined by two optional points, assuring a relatively low complexity and a relatively high extraction ratio. In short, the line segment may be clearly peaking relative to neighboring cells.

On the contrary, LCHT may have a reduced voting frequency as compared with CHT. Owing to a reduced voting area limited to a specified neighboring area, LCHT is not so affected by noise and attains a low complexity and, therefore, a high extraction ratio. Consequently, LCHT can extract a larger number of line segments than CHT if both methods extract the same number of peak points. The segment extracting accuracy of LCHT, however, is unstable since it is determined by the limited area size and the e-resolution of the Hough-space.

As described above, both methods are less affected by noise and attain relatively high extraction ratios. It is difficult for both methods to detect short line segments because they have only a small number of corresponding cells. To extract a larger number of line segments, it is required to extract an increased number of peak points and to do clustering with them. In this regard, LCHT requires a smaller increase of the number of necessary peak points as compared with CHT.

Both methods were compared with each other in regard to the complexity of voting results in the parametric space and the ability of extracting peak points and line segments. The comparison results show that LCHT has a higher ability of extracting peak points and line segment owing to limiting objects to continuous lines and attains a low processing cost owing to a reduced amount of calculations. LCHT has, however, such a drawback that combination of a remarkable pixel with any adjoining pixel may have a reduced $\theta$-resolution of $\pi/4$ and voting frequency may vary depending upon a limited area size, causing an unstable detection result.

It is also considered that both methods (LCHT and CHT) may have unstable parameters $\theta$ (direction of detectable straight lines) and $\rho$ (length of a perpendicular from the origin to a straight line) due to a combination of quantization errors ($\rho$, $\theta$) in the pattern (image) space with the quantization error in the parametric space.

In spite of the above mentioned drawbacks, LCHT is still advantageous and effective to form a distinguishing peak point, obtaining a simple result of voting in the parametric space. Namely, LCHT can easily extract peaking points and, therefore, can detect groups of many straight lines intersecting at a point as shown for example in FIG. 9.

Figure 9:
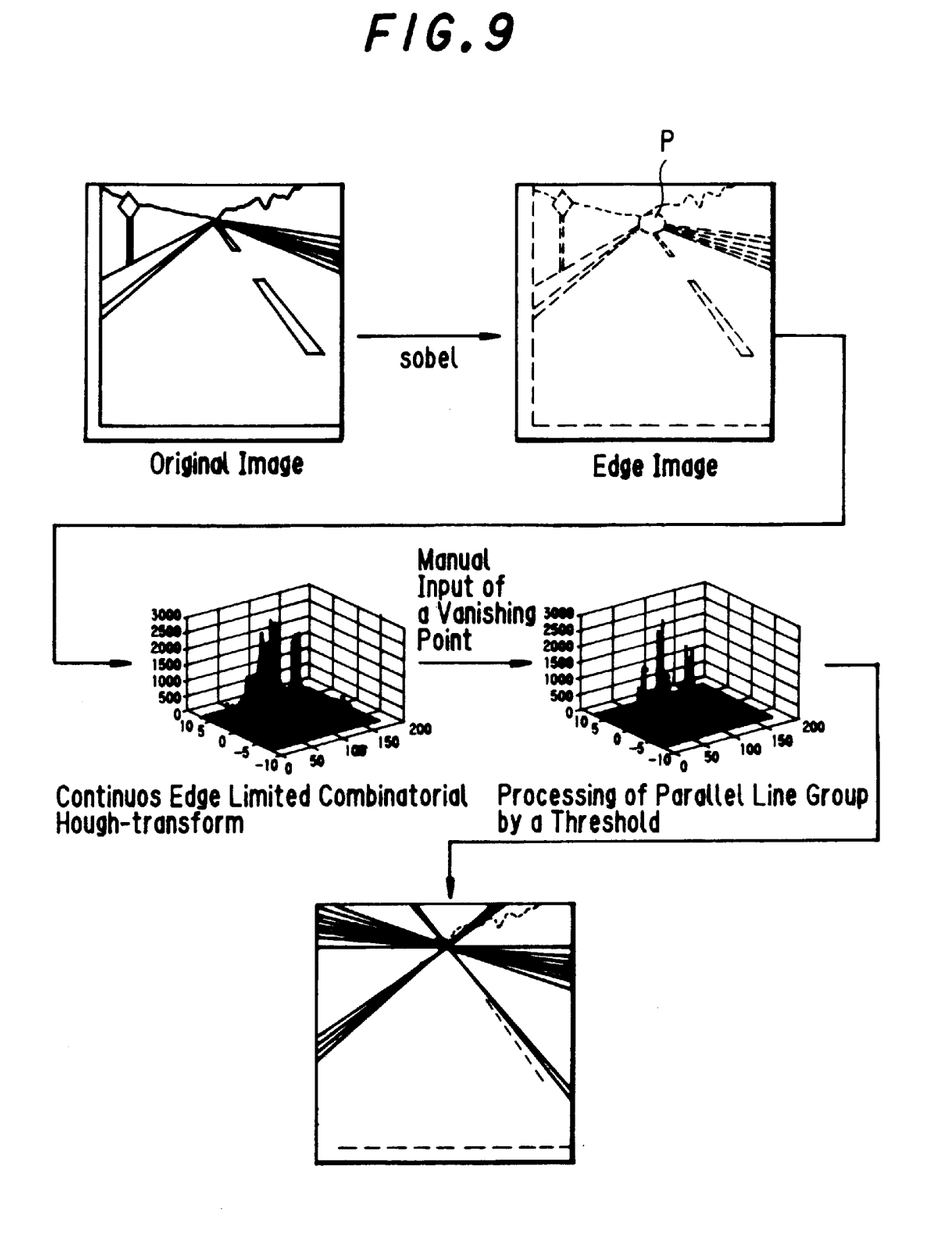
FIG. 9 depicts a procedure of extracting constructional lines directing to a vanishing point of a road by a continuous edge restricting combinatorial Hough transforming method according to the present invention.

FIG. 9 shows a procedure of extracting road construction straight lines extending toward a vanishing point. In the shown instance, LCHT is applied to detect in such a manner that peak points are detected from an image of road edge lines obtained from an original image, a vanishing point (point P in a road edge image) is manually input and then groups of parallel lines are processed by using a threshold to extract groups of parallel lines relating to divisional lines of the road.

Figure 10:
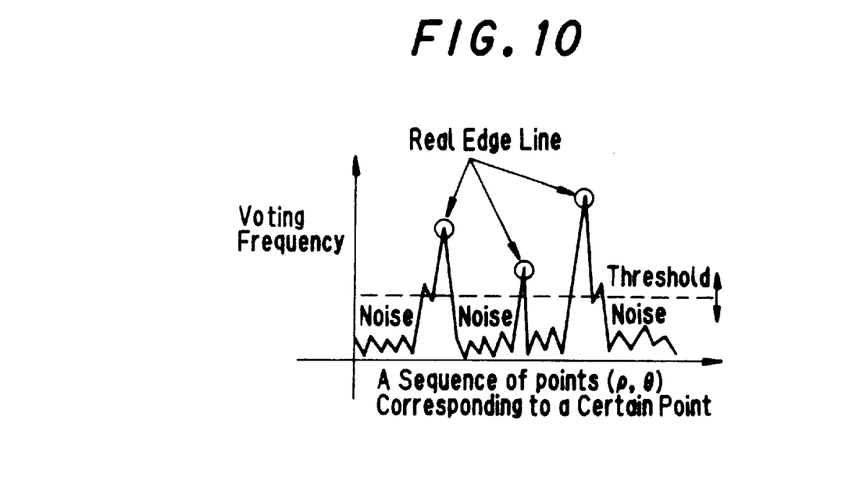
FIG. 10 shows an exemplified characteristic of voting frequencies classified according to a threshold for a series of edge points corresponding to a certain point.

As shown in FIG. 10, the real edge lines of the road are obtained by classifying the extracted parallel lines in groups by a threshold that is a frequency of voting to a point sequence ($\rho$, $\theta$) corresponding to a certain point.

A divisional line indicated on the road can be extracted with a further limited area for selecting edge point since it lies within a certain range of angle $\theta$ in the picked-up image. Thus, the divisional lines can be easily extracted at an increased speed.

Figure 11:
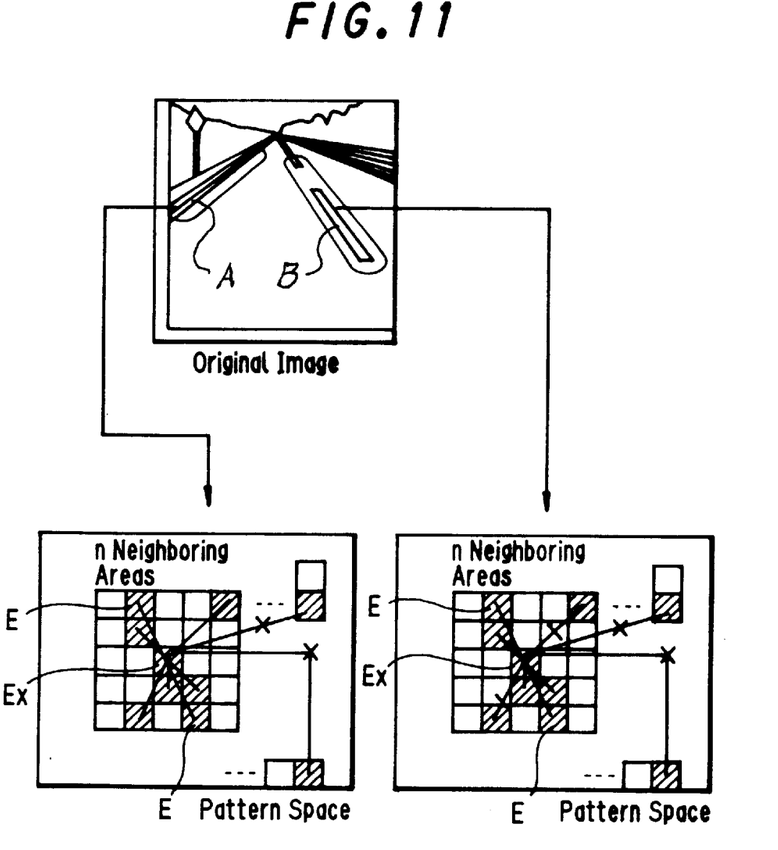
FIG. 11 shows an example of restricting a voting area by using a characteristic of a divisional line of a road in an original image.

FIG. 11 shows an example of a restricted voting area for extracting road divisional lines (stripes) from an original road image, utilizing the above-mentioned feature of road divisional lines. In the original image (FIG. 11), angles $\theta$ of divisional stripes A and B can be estimated to a certain degree and, therefore, points to be paired with an objective point in each road stripe can be detected in a considerably restricted area.

The limited area of each stripe is narrower than that of any other road edges, that enables LCHT to process the stripe data at a higher processing speed and to easily extract a peak point with no voting outside the limited area.

As is apparent from the foregoing, the straight-line detecting method according to the present invention is based on a voting type combinatorial Hough transform method which detect a straight line lying in a X-Y image plane by determining Hough-transform parameters of a straight line passing through a remarkable edge point (x1, y1) and another edge point (x2, y2) in the X-Y plane according to the transform equations (1) and (2) and by voting of pixels corresponding to points ($\rho$, $\theta$) in a $\rho$-$\theta$ plane. This method is further featured in that another edge point (x2, y2) is detected in a specified neighboring area around an area of the remarkable edge point (x1, y1) and thus attains an increased efficiency of processing by restricting voting areas. According to this method, it is possible to detect short line segments without reducing the processing speed.

What is claimed is:

1. A straight-line detecting method comprising steps of: determining parameters of Hough transform of a straight line passing through a remarkable edge point (x1, y1) and another edge point (x2, y2) in a X-Y plane according to the transform equations $\theta=-a\tan\{(x1-x2)/(y1-y2)\}$ and $\rho=x1\cos\theta+y1\sin\theta$; voting of pixels corresponding to parameters ($\theta$, $\rho$); and detecting a straight line lying in the X-Y plane by the number of votes in a plane of $\rho$-$\theta$ parameters, characterized in that said another edge point (x2, y2) is a point existing in any one of specified neighboring areas (left, right, above and below) around a center area where the remarkable edge point (x1, y1) is located, and the specified neighboring areas (right, left, above and below) around the remarkable edge point (x1, y1) are areas each being apart at its boundary from the remarkable edge point pixel (x1, y1) by at least 4 pixels but by not more than 10 pixels.

2. A straight-line detecting method as defined in claim 1, characterized in that a vanishing point is set in the X-Y plane and said another edge point (x2, y2) corresponding to the vanishing point is located in any one of specified neighboring areas existing left, right, above and below around the remarkable edge point (x1, y1).

* * * * *